Patented Oct. 20, 1942

2,299,577

UNITED STATES PATENT OFFICE 2,299,577

ART OF TREATING RESINS

Torsten Hasselstrom and Edward A. Brennan, Savannah, Ga., assignors to G and A Laboratories, Inc., Savannah, Ga., a corporation of Georgia No Drawing. Application February 19, 1941, Serial No. 379,704

12 Claims. (Cl. 260—106)

The present invention relates to the art of treating resin matters for obtaining stabilized and improved products: and this application is a continuation-in-part of application Serial No. 108,308, filed October 29, 1936.

The instability of oleoresins and gum and wood rosins, as is well known to the art, greatly reduces the commercial applications of such substances. Various processes have been proposed as means for overcoming this disadvantage of oleoresins and gum and wood rosins, among which processes may be mentioned hydrogenation, heat treatment, the formation of addition compounds including esters, etc. These prior processes are found in practice to suffer from the disadvantage of high costs of manufacture, so that the employment thereof has been strictly limited; and further, the products are often contaminated by abietenes which render such products unstable to atmospheric conditions. One of the present inventors has recently pointed out (Hasselstrom et al., Journal of American Chemical Society, volume 57, page 2118, 1935) that oleoresins and wood and gum rosins primarily comprise complex mixtures of the abietic and the pimaric types of acids. In such a mixture, the abietic types represent the unstable parts, while the pimaric type is substantially stable to normal atmospheric conditions. The abietic type of acid contains (see Ruzicka et al., Helvetica Chimica Acta, volume 15, page 1289, 1932) a conjugated unsaturation of double bonds; whereas the pimaric type of acid has the double bonds distributed in the molecule more favorably, with a greater stability as an external evidence of such different intramolecular arrangement.

The present invention concerns primarily a process which effects a change in the double bonds in the abietic types of resin acids, and likewise concerns resins and products thereof which are produced through reactions known, to those skilled in the art, as "molecular rearrangements"; and according to this invention, this type of reaction has been applied in a useful manner for producing valuable modified resin materials. The reaction is presently believed to produce a mixture of resin materials; a part of which appear to be formed by purely intramolecular rearrangements, while other parts have greater and lesser degrees of unsaturation, possibly by exchange of hydrogen between molecules of the original material, along with changes in the nuclei of these original molecules.

The modified material, produced according to the present invention, can be utilized in place of common rosin (colophony), and has the advantage of displaying greater stability to atmospheric conditions, so that it provides better bases for the manufacture of varnish, paper size, soaps, ester gum, and the other materials presently made from rosin. As set out hereinafter, it is capable of sulfonation, with the formation of a stable sulfonate which is of great virtue as a detergent, emulsifying agent, wetting agent, and dye fixing agent, while the residue from sulfonation can be utilized as a grease-setting agent.

The process effects a molecular rearrangement and/or increase and/or elimination of double bonds initially present in the resin molecule, in such a way that the final product is a mixture which may be regarded and established as a resin material of the same degree of unsaturation. As stated above, a part of the product mixture appears to be a modified resin which is an intramolecularly rearranged isomer; while other parts comprise resin materials which appear to have been intermolecularly rearranged and hence contain more hydrogen (e. g., $C_{20}H_{32}O_2$) or less hydrogen ($C_{20}H_{28}O_2$) than the molecules of the starting material.

The starting material for the practicing of the present process and the manufacture of the product may be an oleoresin, a gum or wood rosin, or the resin acids thereof, in the raw initial state or following segregation or purification thereof. Such are referred to herein as "rosin materials." Thus, it will be understood that the invention may be practiced upon resin acids such as sapinic, sapietic, abietic, etc., or mixtures thereof with pimaric acid. By "sapinic acid" is understood a mixture or composition of sapietic acid and dextropimaric acid which cannot be separated by crystallization alone: and a "sapietic acid" is one which upon heating or alkali or acid treatment first yields an abietic type of acid and thereafter, by the molecular rearrangement or modification according to the present invention, undergoes the change of the double bonds therein, it being assumed by some workers in the art today that a sapietic acid contains three double bonds. In comparison, the abietic and pimaric types of resin acid contain two double bonds in the molecule: an abietic type of acid upon dehydrogenation with sulphur yields retene (1-methyl-7-isopropylphenanthrene), whereas a pimaric type of acid yields pimanthrene (1,7 methylphenanthrene).

It is characteristic of this invention that the modification or rearrangement proceeds without reducing, in the final mixed product, the unsaturation of the original resin acid molecule (which may be regarded empirically as $C_{20}H_{30}O_2$) of the original oleoresin, gum and/or wood rosin.

It has been found that high yields can be produced, at relatively low temperatures of treatment, by employing catalytic agents which are effective for provoking and/or promoting molecular rearrangement. Theoretically, it might be assumed that the internal molecular structure of the initial abietic type of acid, which is relatively unstable owing to the conjugate double bonds thereof, is caused to become modified so that the linkages in the nuclei are transposed, and the double bonds finally existent are not in conjugate position, whereby a more stable molecular form is present. The catalyst promotes this transposition and facilitates the internal rearrangements. Various catalysts have been found adaptable for the purpose; in particular, higher halogens have been found capable of quickly effecting the change, at relatively low concentrations.

By way of illustration, examples of practicing the invention are set out below, to facilitate the understanding of the invention by those skilled in the art; but it is obvious that these examples are illustrative and not restrictive.

Example I 200 grams of a wood rosin (melting point about 75–80° C.: acid number about 160–165) was melted and poured over 2 grams of iodine. The mixture was heated to about 160–165 degrees C. for 3 hours in an open kettle. Upon cooling, the product had a specific rotation of about plus 10.1, and an acid number about 159.3.

A like conversion product can be obtained by melting the rosin, and then adding the iodine as catalyst with stirring. In commercial practice, it is well to dilute the iodine with paraffine wax (half and half) or like inert extending material to facilitate the distribution prior to excessive local reaction. The paraffine is barely melted, and the dry powdery lumps of iodine are added, with stirring to obtain uniformity so far as possible. The rosin and iodine-wax are then alternately introduced into the batching vessel, the time and quantities of additions being controlled to avoid the foaming which indicates an excessive reaction rate.

When 20 grams of this resin acid (air-dried) are added in small portions to 50 cc. of concentrated (sp. gr. 1.84) sulfuric acid at 15–20 degrees C., and the mixture stirred for 30 minutes, a nearly colorless precipitate is collected upon pouring the mixture onto ice. This precipitate was washed with water, and extrated twice with boiling water, each time employing about 150 cc. The aqueous extracts were combined and concentrated to about 50 cc. and allowed to cool. A yield of sulfonate was obtained of about 30 percent by weight of the initial material. This sulfonic acid had a melting point of about 223–224 degrees C. with decomposition initiating at about 220 degrees C. Similarly, by treatment of the type set out by Hasselstrom, Brennan and McPherson (J. A. C. S. 60, p. 1419, of 1938), the lactone of hydroxy-tetra-hydroabietic acid can be obtained, indicating the presence of dihydroabietic acid ($C_{20}H_{32}O_2$) in the modified resin material.

Example II 200 grams of the same grade of wood rosin was treated with iodine as described in Example I. The product of treatment by heat and iodine was exposed to oxygen for 168 hours. The increase of weight was 0.050 percent (in comparison with Steele's abietic acid which, when exposed for the same period of time and under the same conditions, increases 1.496 percent in weight). The treatment has eliminated Steele's abietic acid originally present by converting it to a stable form. The exposed product was then sulfonated in accordance with the above examples, and the yield of sulfonate was about 40 percent of the weight of the initial material.

The behavior of pure dehydroabietic acid, gum rosin, and the treated rosin of Example I, may be summarized in the following table, indicating the successive changes of weight at the end of twenty-four hour periods of exposure to oxygen:

TABLE A

| Hours | Dehydro-abietic acid | Gum rosin | Treated rosin according to Example I |
|---|---|---|---|
|  | Percent | Percent | Percent |
| 24 | 0.000 | 0.292 | −0.082 |
| 48 | −0.018 | 0.080 | −0.050 |
| 72 | −0.008 | 0.178 | −0.008 |
| 96 | −0.004 | 0.148 | −0.016 |
| 120 | +0.006 | 0.154 | +0.012 |
| 144 | 0.000 | 0.156 | 0.002 |
| 168 | 0.002 | 0.232 | 0.002 |
| ** | −0.026 | 1.240 | −0.170 |

** Shows total increase or decrease of weight after 168 hours.

Example III 200 grams of the same grade of wood rosin was treated with iodine as described in Example I. The product of the treatment (acid number 159.3) with heat and iodine was crystallized thrice from methanol. The purified, crystallized resin acid had an acid number about 183; a melting point of about 176–179 degrees C.; a specific optical rotation (alpha)D minus 7.6; and an empiric composition (according to combustion) of $C_{20}H_{30}O_2$. This acid was sulfonated as described in the above examples, with a yield of sulfonate of about 35 percent.

By successive fractional crystallization, the purified material was separated and two distinctively different acids were obtained, one of which was dehydroabietic acid and the other a novel resin acid of constant optical rotation (alpha) D minus 25 and of melting point 193–196 degrees C. This high melting acid was characterized by its di-n-amylamine salt which has rotation (alpha)D minus 14.5° and melting point 135–137 degrees C. In comparing this with the only other known high melting resin acid of negative rotation, namely Aschan's pinabietic acid, it should be noted that this pinabietic acid is not a chemical individual but a mixture of at least three or four well-defined acids. This separation may be effected by successive fractional crystallizations in ethyl acetate, hexane, methanol, and ethanol. The separated high-melting acid was converted to the di-n-amylamine salt by adding, to an acetone solution of four grams of the material, a quantity of 0.3 gram of di-n-amylamine in acetone; boiling for 10 minutes, filtering and permitting the filtrate to stand. The separated salt was then recrystallized from acetone and methanol. The product was a salt of the aforesaid characteristics.

The free acid may be recovered from the di-n-amylamine salt by dissolving the latter in ethanol, adding a five per cent solution of hydrochloric acid, and pouring the mixture into water. The separated solid is extracted with ether; the ether solution is washed with water and dried with anhydrous sodium sulphate. After evaporating the ether, the remaining solid was recrystallized from methanol whereupon a resin acid with constant optical rotation of (alpha) D minus 24.0° and melting point 193-196 degrees C. was obtained.

From this behavior, it appears that when rosin is treated with iodine as set out in the above examples, a resulting product can be obtained which is devoid of Steele's abietic acid, and contains a mixture of dehydroabietic acid, dihydroabietic acid and a novel resin acid which in the pure state has a melting point of 193-197 degrees C., and optical rotation of (alpha) D minus 24-25°; and which can be identified by its di-n-amylamine salt with a melting point of 135-137 degrees C. and an optical rotation of (alpha) D minus 14.5°.

*Example IV*

The rosin is melted and the temperature held at 160 to 170 degrees C. 0.1 percent of paratoluene sulfonic acid was added with stirring. In 1 to 2 hours' time, about 8 to 10 percent of dehydroabietic acid is formed. 0.5 to 1 percent of idine is then introduced by stirring, and the reaction continued for another hour. The conjoint catalysts serve to convert all of the Steele's abietic acid, so that the product assumes an optimum condition of stability.

*Example V*

200 grams of the same grade of wood rosin were treated with iodine as described in Example I. The product from the treatment by heat and iodine was fractionated by distillation under diminished pressure. The fraction boiling at substantially 215-220 degrees C., under a pressure of about 1-2 millimeters, was of water white color. This was sulfonated as described in Example I, with a dehydroabietic acid sulfonate yield of about 40 percent based on the initial material.

*Example VI*

200 parts by weight of Steele's abietic acid prepared in accordance with the procedure described by Steele in Journal of American Chemical Society, vol. 34, page 1333 (1932), with melting point 163-164 degrees C. and specific rotation about (alpha) D minus 79, was treated with 1 percent of iodine as described in Example I and the mixture heated at 185 degrees C. for 1½ hours; upon cooling, the product had a specific rotation of about (alpha) D plus 18; and was definitely stable against atmospheric oxidation under normal conditions of employment. When sulfonated as described in Example I, the yield of sulfonic acid was about 60 percent, with a melting point at 223 degrees C. with decomposition.

Thus, it will be noted that in each example a resin material was produced which is excellently adapted for use as an improved modified resin; and that this material is capable of sulfonation to the extent stated. Further, this sulfonate is available for employment as a detergent and for the other purposes indicated. The high stability exhibited by the product is set out by the procedure of Example II: and the fact of negative specific optical rotation of the purified resin is indicated by Example III.

The degree of the conversion of Steele's abietic acid appears to be a function of the proportion of iodine and of the time. The stability of the product has an inversely proportional relation to the content of Steele's abietic acid, and it has been found that when less than 10 percent of Steele's abietic acid is present, the material has adequate stability for many purposes.

The higher halogens may be employed, such as bromine and iodine, apparently some advantage being attained in employing mixtures thereof. The quantity to be employed varies with the particular agent and condition of treatment, and it is found that quantities from one-fifth of a percent to 5 percent give the desired effects. The upper limit of proportion with iodine, for example, is around 5 percent, as a greater proportion leads to a definite halogenation, as distinguished from the molecular rearrangement: at 2%, degeneration proceeds upon continued heating. At 0.1 percent is a critical point or threshold value at which catalytic action is found to begin at high temperatures and in long times during which considerable decarboxylation also occurs; and it appears that at least 0.2 percent is necessary for the production of commercially valuable changes.

For optimum production of the stable $C_{20}H_{28}O_2$ acid, and elimination of essentially all the Steele's abietic acid, a proportion of ½ to 1 percent is presently preferred, as the product then attains adequate stability for employment in adhesives and chewing gum in a reasonable treatment time. For commercial production of a material for less-exacting employment, 0.3 to 0.4 percent can be employed, with the conversion of Steele's abietic acid of ordinary rosin to a content below 10%, and the product is then suitable for ester gums of superior stability.

By way of comparison of the behavior with different proportions of iodine as catalyst, individual portions of a rosin with melting point 75.5 degrees C.; rotation (alpha) plus 2.0 degrees; and acid number 163 were heated to 160 degrees C.. and the catalyst then introduced. The temperature was held at 160 to 165 degrees C. for three and a half hours. In each instance, 100 grams of the treated rosin were then mixed with 200 cc. of concentrated sulfuric acid, while maintaining a maximum temperature during the addition at less than 30 degrees C.: the sulfonation product was extracted with 2500 cc. of hot water, and evaporated to crystallization: the water insoluble material was saponified with 1000 cc. of one percent sodium hydroxide and extracted with ether, the ether solution washed with sodium bicarbonate solution and water, dried over sodium sulfate, evaporated, and the lactone crystals recrystallized from acetone. The quantities of crystalline sulfonate and crystalline lactone were noted.

TABLE B

| | Catalyst | Apparent softening point | (Alpha) D | Acid number | Sulfonic acid | Lactone |
|---|---|---|---|---|---|---|
| | *Percent* | *Degrees* | *Degrees* | | *Percent* | *Percent* |
| 1 | 0.0 | 76.0 | −7.4 | 162.3 | 4.0 | 4.2 |
| 2 | 0.1 | 75.5 | −19.5 | 162.9 | 3.5 | 3.4 |
| 3 | 0.2 | 76.5 | −10.0 | 163.4 | 9.5 | 2.0 |
| 4 | 0.5 | 74.5 | −8.1 | 162.7 | 11.0 | 3.0 |
| 5 | 1.0 | 73.0 | −3.5 | 160.8 | 16.0 | 4.0 |
| 6 | 1.5 | 70.5 | +16.5 | 158.1 | 41.0 | 4.6 |
| 7 | 2.0 | 69.0 | +25.8 | 155.2 | 48.0 | 4.7 |

The differences of the products will be remarked. Up to about 0.1 percent of catalyst, the optical rotation is increasingly negative, and the quantity of sulfonate remains substantially constant.

The effects of low percentages at higher temperatures were studied by employing a wood rosin having a melting point of 74.0 degrees C.; rotation (alpha)D=minus 3.0 degrees; acid number 154, by specimen 8 heating to 300 degrees C. for fifty minutes and specimen 9 heating to 145 degrees, introducing the catalyts and heating to 300 degrees for fifty minutes. Sulfonate and lactone determinations were then made as above, with the results:

TABLE C

| | Catalyst | Apparent softening point | Acid number | Sulfonic acid | Lactone |
|---|---|---|---|---|---|
| 8 | Percent 0.1 | Degrees 80.5 | 126.2 | Percent 24.5 | Percent 1.5 |
| 9 | 0.1 | 74.0 | 126.0 | 25.0 | 2.5 |

The stability of the products of Tables B and C was determined by direct oxygen absorption, expressed in percentage gain of weight for examples of approximately 5 grams each.

TABLE D

Stability tests

| | 1 day | 2 days | 3 days |
|---|---|---|---|
| | Percent | Percent | Percent |
| Untreated rosin of Table B | 0.068 | 0.212 | |
| Specimen (1) of Table B | 0.092 | 0.206 | |
| Specimen (2) of Table B | 0.068 | 0.162 | |
| Specimen (3) of Table B | −0.008 | −0.026 | |
| Specimen (4) of Table B | −0.040 | −0.046 | |
| Specimen (5) of Table B | −0.026 | | 0.076 |
| Specimen (6) of Table B | 0.002 | | 0.072 |
| Specimen (7) of Table B | −0.012 | | 0.020 |
| Untreated rosin of Table C | 0.098 | | 0.246 |
| Specimen (8) of Table C | 0.212 | | 0.344 |
| Specimen (9) of Table C | 0.112 | | 0.222 |
| Same as (9) but using 0.2% catalyst | 0.044 | | 0.128 |

The temperature to be employed likewise varies according to the initial product being treated, and in accordance with the purpose of employment of the final resin. Thus, at the lower temperatures, the product is substantially free from hydrocarbons produced by decomposition, and hence the product is excellently adapted for employment in varnishes, sizes, etc.: and it is possible to obtain relatively high yields and thorough elimination of Steele's abietic acid by the action of the catalyst. On the other hand, when it is intended to employ the material as a detergent, either as a resin soap or after sulfonation, this stability and absence of hydrocarbons is of secondary importance, and the reaction can be carried out at a higher temperature and in a lesser time, due care being taken to avoid extensive losses or decarboxylation changes by destructive distillation effects which begin to become evident at 220 degrees C. during the times utilized for the conversion, so that 200 degrees should be observed as an upper limit in commercial work. The reaction progresses to a noticeable degree in the presence of catalysts at 100 degrees C.; while the maximum temperature is essentially determined by the destruction of the rosin at 240 degrees C. by a far-reaching destructive distillation, and with the formation of carbon dioxide and abietenes. For maximum stability and efficiency of production, it is preferred to operate commercially at an initial temperature of 160 to 165 degrees C. in the presence of iodine as a catalyst, the rate of addition being regulated to prevent a rise above 190 degrees C. as a preferred maximum.

The product is characterized by increased resistance to the effects of light, heat, and air, this resistance being an optimum, among the products of the above examples, when the process of Example I is followed with respect to temperature conditions. The purified material is characterized in being substantially free of Steele's abietic acid, and in containing an abietic type of acid which does not have a conjugate double bond, has substantially the same unsaturation as the normal abietic acids of colophony, has a negative specific rotation, an acid number of about 150–180, and is able to undergo sulfonation with the production of a more stable sulfonate than can be derived directly from colophony. The refined material is of water white color, great hardness, and great stability and resistance to the effects of heat, light and air. Even in the crude and relatively unrefined condition, it is of great value for the aforesaid purposes, by reason of its superior stability. It has very superior properties as a starting material for producing a sulfo-resin acid upon sulfonation thereof, and can be employed directly as a base for varnishes, sizes and the like. The sulfonation residue is superior in its grease-setting properties, so that it is highly valuable in the manufacture of certain lubricants.

It is obvious that the invention is not limited to the examples specifically set out, nor to the modifications indicated therein; but that it may be employed in many ways within the scope of the appended method claims.

We claim:

1. The process of increasing the resistance to the effects of heat, light and air, in rosin materials containing radicals of Steele's abietic acid, which comprises the step of heating to a temperature of 100 to 240 degrees C. and below the temperature of substantial destructive distillation and in the presence of elemental iodine in an amount equal to one-fifth to five percent of the amount of abietic type of resin acid and for a time until the quantity of Steele's abietic acid has been reduced to below ten percent of the original content thereof.

2. The process of increasing the resistance to the effects of heat, light and air, in rosin materials containing an abietic type of resin acid having a conjugated double bond, which comprises the step of heating to a temperature in excess of substantially 100 degrees C., and maintained below 240 degrees C. whereby to prevent substantial destructive distillation of said resin material, and in the presence of elemental iodine as a catalyst capable of provoking a molecular rearrangement by transposition from a molecular form having a conjugated double bond into a form which is characterized in being able to produce pseudopimaric acid sulfonate on sulfonation, the amount of iodine being substantially one percent of the amount of the abietic type of resin acid and the heating being continued until less than ten percent of the original content of said abietic type of acid remains.

3. The process of increasing the resistance to the effects of heat, light and air, in rosin materials containing an abietic type of resin acid having a conjugated double bond, which comprises the step of heating to a temperature of substantially 150 to 165 degrees C. and in the presence of an amount of elemental iodine equal to substantially one percent of the amount of abietic type of resin acid and for a time of substantially three hours.

4. The process of producing a resin material from rosin materials containing radicals of Steele's abietic acid and having an increased resistance to the effects of light, heat and air, which includes the step of heating to a temperature of substantially 160 to 165 degrees C. for three hours in the presence of substantially one percent of elemental iodine.

5. The process of converting Steele's abietic acid into a form resistant to the effects of heat, light and air, which comprises the step of heating to a temperature of substantially 160 to 200 degrees C. and in the presence of 0.3 to 1 percent of elemental iodine for a time until the specific optical rotation becomes positive.

6. The process of increasing the resistance to the effects of heat, light and air, of Steele's abietic acid, which comprises the step of heating to a temperature of substantially 160 to 200 degrees C. and in the presence of 0.3 to 0.4 per cent of elemental iodine until less than 10 percent of the original content of Steele's abietic acid remains.

7. The process of increasing the resistance to the effects of heat, light and air, in rosin materials containing Steele's abietic acid without essential change of the acid number, which comprises the step of heating to a temperature of substantially 160 to 200 degrees C. and in the presence of one-fifth to five percent of elemental iodine and thereby effecting molecular rearrangement until Steele's abietic acid has been essentially totally eliminated.

8. The process of increasing the resistance to the effects of heat, light and air, in rosin materials containing an abietic type of resin acid having a conjugated double bond, which comprises the steps of heating to a temperature of substantially 160 to 190 degrees C. and in the presence of a fraction of a percent of paratoluene sulfonic acid until a substantial part of the abietic acid of Steele's type has been eliminated, then adding one-fifth of five percent of elemental iodine, and continuing the heating until the Steele's abietic acid is substantially all eliminated.

9. The process of increasing the resistance to the effects of heat, light and air, in rosin materials containing an abietic type of resin acid having a conjugated double bond, which comprises the steps of heating to a temperature of substantially 160 to 190 degrees C. and in the presence of a fraction of a percent of paratoluene sulfonic acid until a substantial part of the abietic acid of Steele's type has been eliminated, then adding one-fifth to five percent of elemental iodine, and continuing the heating until the Steele's abietic acid is substantially all eliminated.

10. The process of stabilizing rosin materials, which comprises melting an insert solid wax with iodine particles to produce an iodine mixture with the said wax surrounding and distributing the iodine, melting the rosin material and maintaining the same molten and at a temperature between substantially 160 and 200 degrees C., and introducing the iodine mixture at a rate insufficient to cause substantial foaming and in a total quantity of iodine equal to one-fifth to five percent of the rosin.

11. The process of stabilizing rosin materials containing radicals of Steele's abietic acid, which comprises preparing an iodine-paraffine wax mixture containing the ingredients in substantially equal parts with the paraffine surrounding and distributing the iodine, melting the rosin material, and intermingling the paraffine-iodine mixture with the molten material at a rate insufficient to cause substantial foaming and insufficient to produce a temperature rise above 200 degrees C., and while maintaining the operating temperature essentially between 160 and 190 degrees C., the total molecular quantity of iodine introduced being by weight from 0.3 to 2 percent of that of the radicals of Steele's abietic acid.

12. The process of stabilizing rosin materials containing radicals of Steele's abietic acid, which comprises preparing a paraffine-iodine mixture containing the ingredients in substantially equal parts with the paraffine surrounding and distributing the iodine, melting a part of the rosin material, intermingling the paraffine-iodine mixture therewith at a rate insufficient to cause substantial foaming and insufficient to produce a temperature rise above 200 degrees C. and while maintaining the operating temperature essentially between 160 and 190 degrees C., and successively introducing portions of rosin material and of paraffine-iodine mixture as the reaction subsides, the prevailing quantity of iodine being maintained at substantially 0.3 to 2 percent of the quantity of rosin material.

TORSTEN HASSELSTROM.
EDWARD A. BRENNAN.